United States Patent
Cornic et al.

(10) Patent No.: US 8,378,885 B2
(45) Date of Patent: Feb. 19, 2013

(54) DEVICE AND METHOD FOR LOCATING A MOBILE APPROACHING A SURFACE REFLECTING ELECTROMAGNETIC WAVES

(75) Inventors: Pascal Cornic, Brest (FR); Eric Barraux, Brest (FR); Patrick Garrec, Merignac (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 12/531,657

(22) PCT Filed: Mar. 14, 2008

(86) PCT No.: PCT/EP2008/053058
§ 371 (c)(1),
(2), (4) Date: Nov. 17, 2009

(87) PCT Pub. No.: WO2008/113750
PCT Pub. Date: Sep. 25, 2008

(65) Prior Publication Data
US 2010/0085237 A1 Apr. 8, 2010

(30) Foreign Application Priority Data
Mar. 16, 2007 (FR) ...................................... 07 01926

(51) Int. Cl.
*G01S 13/08* (2006.01)
(52) U.S. Cl. ............................. 342/123; 342/29; 342/30
(58) Field of Classification Search .............. 342/29–30, 342/123
See application file for complete search history.

(56) References Cited

U.S. PATENT DOCUMENTS

| | | | |
|---|---|---|---|
| 3,737,908 A * | 6/1973 | Nemit | 343/754 |
| 3,742,505 A | 6/1973 | Rocke | |
| 4,316,191 A * | 2/1982 | Sawatari et al. | 342/91 |
| 5,598,163 A * | 1/1997 | Cornic et al. | 342/70 |
| 5,812,091 A | 9/1998 | Robinson | |
| 2004/0046687 A1* | 3/2004 | LaFrey et al. | 342/33 |
| 2005/0046607 A1* | 3/2005 | Volman | 342/109 |

FOREIGN PATENT DOCUMENTS

| | | |
|---|---|---|
| FR | 2690755 A1 | 11/1993 |
| FR | 2878336 A1 | 5/2006 |
| WO | 2006053868 A1 | 5/2006 |

* cited by examiner

*Primary Examiner* — Timothy A Brainard
(74) *Attorney, Agent, or Firm* — Strook & Strook & Lavan LLP (57) ABSTRACT

Device and a method for locating a mobile object approaching a surface reflecting electromagnetic waves. The location device includes an emission antenna and a reception antenna. The emission antenna has one or more emission positions emitting a detection signal toward the mobile object. The reception antenna has at least one column of one or more reception positions, receiving a signal transmitted by the mobile object. An emission of the detection signal is activated on each emission position. An emission position that produces a detection by the reception antenna, of the signal of maximum energy transmitted by the mobile object, is selected to track the mobile object. One or more signals of maximum energy, received by one or more reception positions, are used to angularly locate the mobile object. The invention can be used to determine the position of an aircraft in the final landing phase for a guidance device.

15 Claims, 6 Drawing Sheets

DEVICE AND METHOD FOR LOCATING A MOBILE APPROACHING A SURFACE REFLECTING ELECTROMAGNETIC WAVES

CROSS REFERENCE TO RELATED APPLICATIONS

The present application is the U.S. National Phase of International Patent Application Serial No. PCT/EP2008/053058, filed on Mar. 14, 2008, which claims the benefit of French Patent Application Serial No. 07/01926, filed on Mar. 16, 2007, both of which are hereby incorporated by reference in their entireties.

BACKGROUND OF THE INVENTION

The present invention relates to a device and a method for locating a mobile approaching a surface reflecting electromagnetic waves. The invention can be used, for example, in order to determine the position of an aircraft in the final landing phase for a guidance device.

The landing of an aircraft is a very tricky phase during which the slightest positioning error can lead to major damage to the aircraft. Notably, manual guidance during the landing phase is hazardous because of the difficulties in assessing the distance of the aircraft, the presentation of the aircraft and its real speed. Thus, a number of automatic guidance systems have been implemented in order to guide aircraft during a landing phase. The automatic guidance of an aircraft involves accurately determining the current position of the aircraft in order to correct, possibly automatically, its trajectory to align it correctly with a landing runway for example. This determination of the current position of the aircraft can be performed using various systems.

BRIEF DESCRIPTION OF THE PRIOR ART

Among these systems, the best known are ILS (Instrument Landing Systems). The ILS systems are instrument approach systems for aircraft that are equipped therewith. The ILS system makes it possible to indicate to the pilot the maneuvers to be carried out for a successful landing. These systems therefore require specific instrumentation on board the aircraft and detection and guidance systems on the ground. The ILS systems are divided into three categories: category one, category two and category three. Among these three categories, only category three can be used in all weathers.

Another guidance system employed at airports is the MLS, standing for Microwave Landing System. The MLS is a microwave landing system. It can be used to provide precision guidance for a landing, regardless of the meteorological conditions. The ILS and MLS systems are very heavy equipment, both on the ground and on board the aircraft. While they are suited to airport installations of wide coverage, it is totally impossible to consider equipping small aerodromes with such equipment. In addition, light aircraft cannot host the equipment needed to implement these systems, as much for reasons of cost as for lack of space.

Apart from these conventional means primarily used by commercial civilian aviation, other solutions can be envisaged.

A first solution uses the GPS system, or Global Positioning System, or even the DGPS system, standing for Digital Global Positioning System. The main drawback of the GPS systems is their lack of robustness. In practice, the GPS service is not always available. Moreover, GPS location efficiency can be degraded by multiple reflections in the vicinity of the ground.

A second solution is to use a LIDAR, or Light Detection And Ranging, system. This location system, which operates on the same principle as radar, uses electromagnetic waves in the visible range, or in the infrared range. This therefore makes it unusable when the meteorological conditions are unfavorable. In addition, the LIDAR beam is very narrow. It is therefore essential to carry out a large number of sweeps to detect a target. This makes the search time relatively lengthy in a phase during which it is important to lock onto the target as rapidly as possible. This solution also requires accurate positioning relative to the landing runway.

Another solution consists in using a highly directional millimetric wave radar. The millimetric wave radar also requires a search phase to designate the target. It must also be positioned accurately relative to the landing runway. In addition, even by using a very narrow radar beam, when the target is very close to the ground, the reflections of the waves on the ground are superimposed on the reflection of the wave emitted by the radar on the target, making the detection unreliable and imprecise. This solution is also very costly and requires a responder on board the aircraft. The responder is itself costly, bulky, heavy, and consumes a lot of energy.

Solutions commonly set up to overcome the problems of reflections on the ground consist notably in filtering, on the radar antenna, the signals reflected by the ground by minimizing the contribution of these signals through an appropriate orientation and directivity of the beam from the radar antenna.

The filtering of such signals requires highly directional antennas that are pointed very accurately. These antennas apply complex processing operations, such as high resolution adaptive processing, to the received signal. The adaptive processing operations require significant computation means while being very sensitive to the assumptions made on a propagation model of the wave to be processed. In particular, assumptions must be made as to the consistency or otherwise of the reflections with respect to the direct signal, the direct signal being the signal not reflected on the ground. These assumptions are not borne out in all cases. This makes these processing operations not very robust and difficult to implement.

The contribution of the signals reflected by the ground in the received signal can be minimized by an accurate positioning of the antenna of the radar so as, for example, to place the paths reflected by the ground in empty spaces in the pattern of the antenna. This minimizing can be done by array antennas of large dimensions that perform an appropriate spatial filtering making it possible to improve the contrast of the direct signal relative to the reflected signal while preserving an adequate gain in the direction of the direct path. The reduction in the aperture of the antenna beam that is needed for this type of processing involves increasing the dimensions of the antenna. However, the dimensions of the antenna are greatly constrained, notably by its physical location. In practice, for practical and safety reasons, it is impossible to deploy a radar antenna of large dimensions at the edge of a landing runway.

SUMMARY OF THE INVENTION

One aim of the invention is notably to overcome the above-mentioned drawbacks. To this end, the subject of the invention is a device and a method for locating a mobile approaching a surface reflecting electromagnetic waves.

The location device can notably comprise:
an emission antenna;
a reception antenna.

The emission antenna comprises, for example, one or more emission positions. Each emission position can emits a detection signal toward the mobile. The reception antenna comprises, for example, at least one column consisting of one or more reception positions. Each reception position can receive a signal reemitted by the mobile. An emission of the detection signal is activated on each emission position. An emission position that has thus given rise to a detection by the reception antenna of the signal of maximum energy reemitted by the mobile is selected to perform a location of the mobile. One or more signals of maximum energy can be received by one or more reception positions. These signals of maximum energy can indicate the detection of the mobile. The signals of maximum energy are then preferably used to locate the mobile.

The reception positions receiving a signal of maximum energy are used for an angular location of the mobile in a plane substantially parallel to the surface reflecting the electromagnetic waves.

All the reception positions are used for an angular location of the mobile in a plane substantially perpendicular to the surface reflecting the electromagnetic waves.

The reception antenna comprises a number of reception subarrays comprising radiating elements. A reception position corresponds, for example, to the position of a fixed reception subarray. The reception subarrays can then be activated in succession.

The emission antenna comprises a number of emission channels. An emission position corresponds, for example, to the position of a fixed emission channel. The emission channels can then be activated in succession.

The reception antenna can comprise one or more reception subarrays consisting of radiating elements. The reception subarray(s) can be moved to the reception positions.

The reception subarray(s) can be moved continually.

The emission antenna can comprise one or more emission channels being moved to the emission positions.

The emission channel(s) can be moved continually.

The reception positions are, for example, spaced apart using an irregular spacing law.

The reception positions are, for example, spaced apart using a progressive spacing law.

The emission antenna and the reception antenna can be collocated.

The mobile is, for example, an aircraft.

The location method can comprise at least the following steps:
a first step of selecting an emission position having given rise to a detection by the reception antenna of the signal of maximum level reemitted by the mobile in order to perform a location of the mobile;
a second step of locating the mobile by using one or more signals of maximum energy received by one or more reception positions.

An angular location of the mobile in a plane substantially parallel to the surface reflecting the electromagnetic waves is performed by using one or more signals of maximum energy received by one or more reception positions.

An angular location of the mobile in a plane substantially perpendicular to the surface reflecting the electromagnetic waves is performed by using the signals received by each reception position.

The mobile is, for example, an aircraft.

The main benefits of the invention are notably that it gives a good accuracy for locating the aircraft by applying robust and simple processing operations. The radar antenna according to the invention advantageously has small dimensions and tolerates an approximate positioning without the location results being degraded.

BRIEF DESCRIPTION OF THE DRAWINGS

Other features and benefits of the invention will become apparent from the following description, given by way of illustrative and nonlimiting example, and given in light of the appended drawings which represent.

DETAILED DESCRIPTION

Figure 1:
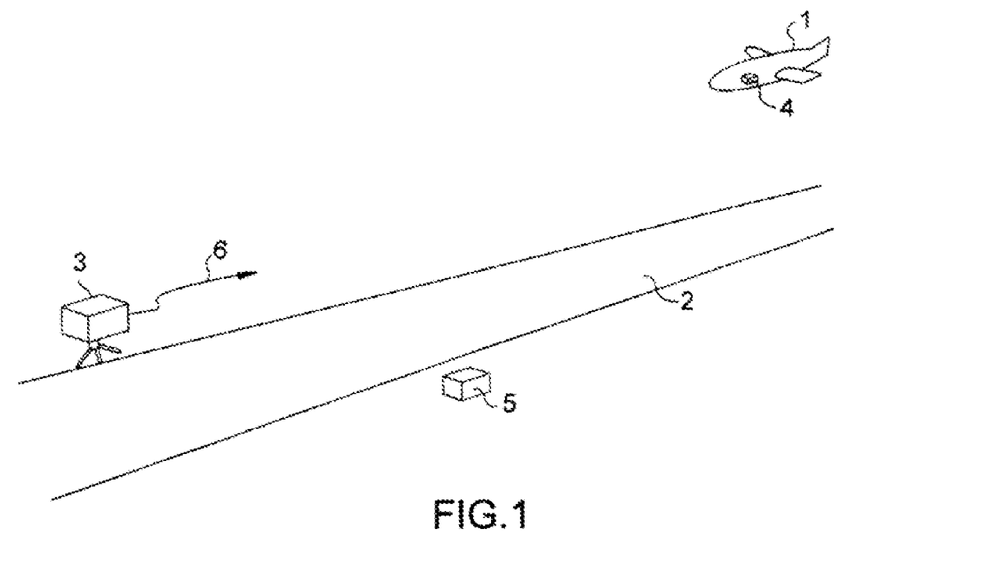
FIG. 1: an example of an aircraft landing aid device.

FIG. 1 represents an aircraft 1 in the phase of landing on a landing runway 2. The aircraft 1 can be guided by a device notably comprising a radar 3, a first beacon 4, notably active, on board the aircraft 1, a second beacon 5, for example passive, situated at the edge of the runway 2. This guidance device is notably described in the French patent application No. 04 12313.

Guiding the aircraft 1 in the landing phase entails knowing the position of the aircraft 1 accurately and, notably, its coordinates in azimuth and in elevation. To this end, the radar 3 emits a detection signal 6 toward the aircraft 1, that will also hereinafter be called target 1 of the radar 3. The outer skin of the aircraft 1 returns the received signal 6 in the form of an echo. The first onboard beacon 4, on detecting the signal 6 emitted by the radar 3, also sends a response signal toward the radar 3. The radar 3 therefore receives a skin echo from the aircraft 1 and a signal coming from the first beacon 4 on board the aircraft 1. The signal returned by the first beacon 4 advantageously provides for a more accurate location of the aircraft than the echo originating from the skin of the aircraft 1.

The presence of the second beacon on the ground 5 enables the radar 3 to perform differential measurements in order to cancel out the detection bias. The accuracy of the positioning measurements concerning the aircraft 1 by the radar 3 is therefore advantageously improved by the presence of the second beacon 5.

Figure 2:
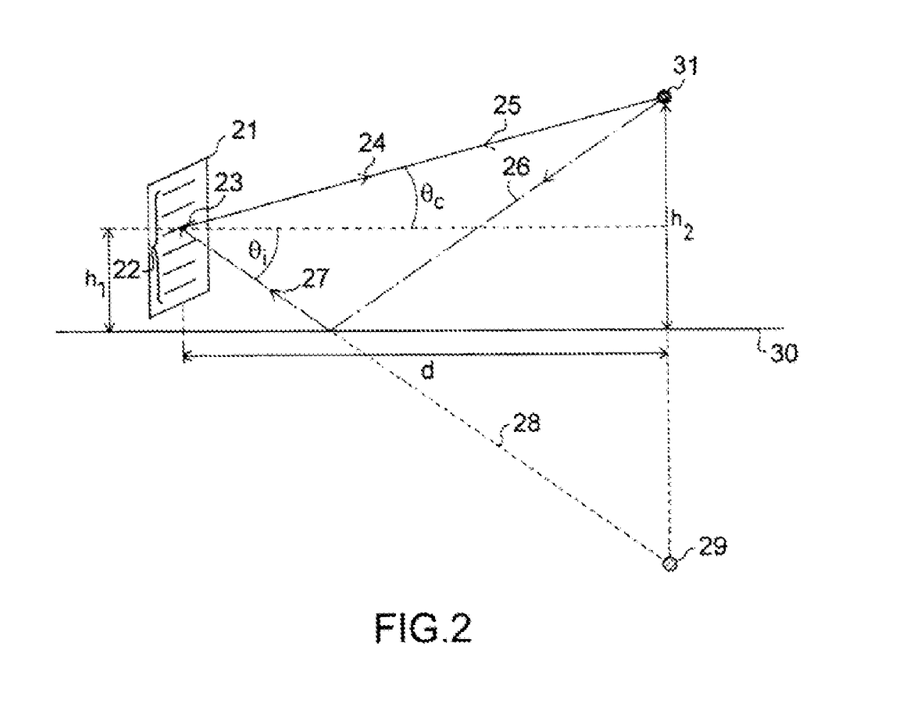
FIG. 2: a phenomenon of reflection on the ground of a wave emitted by an aircraft following the reception of a radar signal.

FIG. 2 diagrammatically represents a radar antenna 21. The radar antenna 21 is notably situated at a low height relative to the ground 30. The radar antenna 21 comprises P lines of independent radiating elements 22. The P lines of radiating elements 22 are spaced apart, regularly or not, and arranged in a substantially horizontal manner in the vertical plane of the radar antenna 21. The plane of the radar antenna 21 is notably substantially perpendicular to the ground 30. The radar antenna 21 can comprise an emission antenna and a reception antenna that are collocated.

FIG. 2 represents different signals emitted or received by the radar antenna 21 operating in signal reception mode.

In order to simplify FIG. 2, only the signals emitted or received by one of the lines of radiating elements 22 of the antenna 21 are represented. The line 23 of radiating elements 55 concerned is situated, for example, at a height $h_1$ from the ground 30.

The line 23 of radiating elements emits a first detection signal 24 toward a target 31. This target 31 can, for example, be the aircraft 1 with the first beacon 4 on board. In FIG. 2, the target 31 is situated at a height $h_2$ from the ground 30 and at a horizontal distance d from the radar antenna 21.

The first detection signal 24 is then reemitted by the target 31 in the form of a second signal 25, 26. The second response signal 25, 26 can be either a skin echo from the aircraft 1 or a signal emitted by the first beacon 4 in response to the first detection signal 24. When it is a skin echo, the target 31 is a passive source, whereas if the response comes from the first beacon 4, the target 31 is an active source.

The second response signal 25, 26 comprises a number of paths 25, 26 emitted in different directions. A first path 25 is a direct path 25 leaving from the target 31 and arriving on the line of radiating elements 23. The first path 25 for example forms with the horizontal an angle $\theta_c$, also called elevation angle of the target 31 seen from the radar antenna 23. The second path 26 is emitted toward the ground 30, or any other reflecting surface, by the target 31. The second path 26 is reflected in a quasi-specula manner by the ground 30 because of the low altitude of the target 31. The reflection of the second path 26 on the ground 30 notably gives rise to a third path 27 that is directed toward the line of radiating elements 23. The third path 27 can be represented by the continuation of a fourth path 28 of a third hypothetical signal 27, 28 emitted by an image 30, of the source 31. In the case, of FIG. 2, with a flat and horizontal ground 30, the image 30, is the orthogonal projection of the source 31 relative to the ground 30. The third path 27 for example forms with the horizontal an angle $\theta_i$, called elevation angle of the image 29, seen from the radar antenna 23.

The system consisting of the target 31 and its image 30, forms a target-image bipole 31, 29. A fourth signal 25, 27, received by the line of radiating elements 23, therefore comprises the first path 25 of the second signal 25, 26 emitted by the target 31 and the third path 27 derived from the third hypothetical signal 27, 28 emitted by the image 30, of the target 31.

The reflection phenomenon described also applies when operating the antenna in emission mode. In practice, a first emitted signal 24 can also comprise a number of paths, some of which can be reflected on the ground 30. Since the phenomenon is similar, it is not represented in FIG. 2.

Figure 3:
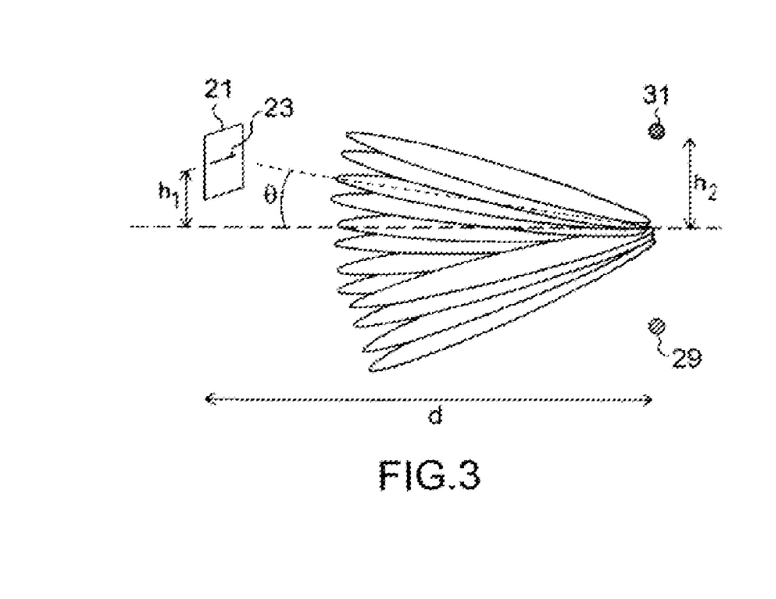
FIG. 3: a diagram of interferences of a signal coming from a target and its image.

FIG. 3 represents an interference diagram of the fourth signal 25, 27 received by the antenna 21. The fourth signal 25, 27 received by the antenna 21, in sinusoidal form, originates from the target-image bipole 31, 29 as if it were a fifth signal emitted by a one-off system situated, for example, at the center of the target-image bipole 31, 29.

The target 31 is, for example, situated at a height $h_2$ relative to the ground 30. The fourth composite signal 25, 27 coming from the target 31 and from its image 30, generates, on the radar antenna 21, an interferometry figure whose frequency is $2h_2/\lambda d$, expressed in m$^{-1}$, in which m is used for meters, $\lambda$ being the wavelength of the fourth signal 25, 27 received by the radar antenna 21. The frequency of the interferometry figure is therefore independent of the value of the coefficient of reflection of the second path 26 of the second signal 25, 26 on the ground 30.

The physical quantities that characterize the interference diagram at a given instant are as follows:
- d: the projected distance on the ground 30 between the target 31 and the radar antenna 21;
- $\theta$: the viewing angle of the line of radiating elements 23 toward the target-image bipole 31, 29 relative to the horizontal plane of the ground 30;
- $h_1$: the height relative to the ground 30 of the line of radiating elements concerned 23 on the antenna 21;
- $h_2$: the height of the target relative to the ground 30.

The amplitude interference diagram resulting from the modeling of the fifth signal emitted by the target-image bipole 31, 29 is expressed, to within a multiplying constant, by an equation of the following form:

$$|I(\theta)|^2 = 1 + \rho^2 + 2\rho\cos((4\pi h_2 \sin(\theta))/\lambda) + \phi) \qquad (1)$$

in which
- $\rho$ represents the amplitude of the ground reflection coefficient,
- $\phi$ is a phase difference between the incident third path 27 and the first path 25 reemitted by the target 31,
- $\lambda$ is the wavelength of the first signal 24 emitted by the antenna 21.

Given that the radar antenna 21 is close to the ground 30 and that the target 31 is in the landing phase, the target 31 is also close to the ground 30. The height $h_2$ relative to the ground 30 is therefore low compared to the distance d. It can therefore be considered that the angle $\theta$ has low values. This therefore makes it possible to simplify the equation (1) in order to obtain, for the interference, the following formula, by likening sin($\theta$) to $\theta$:

$$|I(\theta)|^2 = 1 + \rho^2 + 2\rho\cos((4\pi h_2 \theta)/\lambda) + \phi) \qquad (2)$$

If $h_1$ is the height of a radiating line 23 of the antenna 21, for low values of $\theta$, the following relation applies: $h_1 = d \times \theta$ (3)

which gives, for the equation (2), the following form:

$$|I(h_1)|^2 = 1 + \rho^2 + 2\rho\cos((4\pi h_2 h_1)/\lambda d) + \phi) \qquad (4)$$

This relation (4) expresses the appearance of the interference curve in amplitude as a function of the height $h_1$ of the fourth signal 25, 27 received by a line of radiating elements 23 of the radar antenna 21.

Given the distances involved, the far field hypothesis is considered to be borne out, which means that the paths of the third signal lo emitted by the target 31 are considered to be parallel with each other, as are the paths of the fourth signal emitted by the target 31. This hypothesis makes it possible to have, for the difference in length between the length $r_1$ of the first direct path 25 and the length $r_2$ of the reflected paths 26, 27 consisting of the second path 26 and the third path 27, a good approximation which is:

$$r_2 - r_1 = (2 \times h_1 \times h_2)/d \qquad (5)$$

Figure 4:
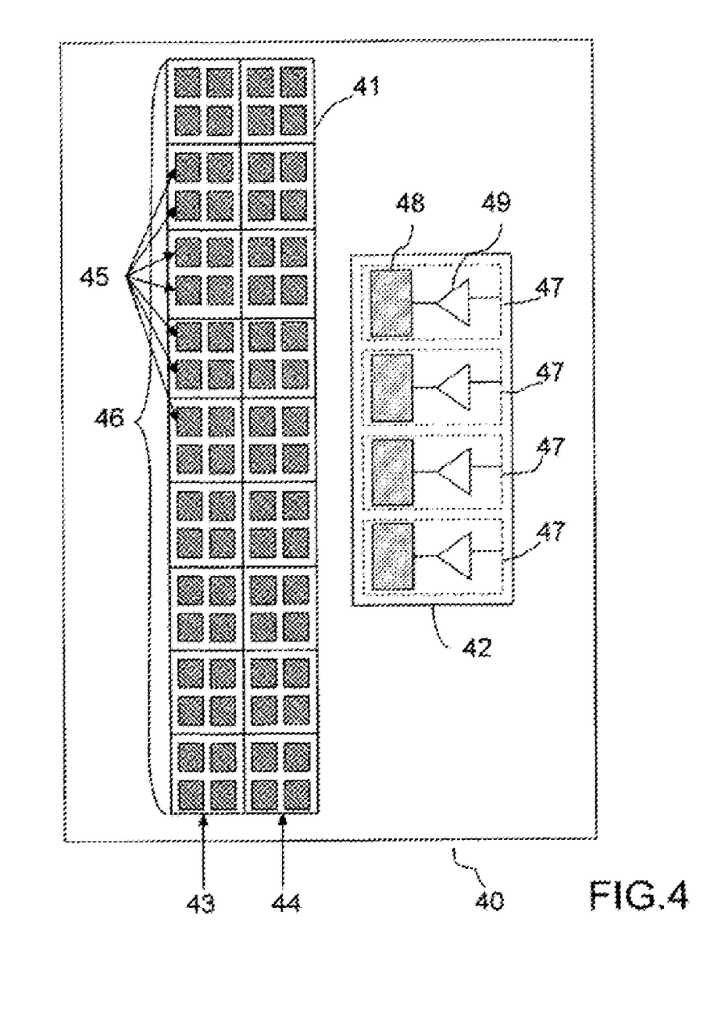
FIG. 4: a schematic diagram of a radar antenna according to the invention.

FIG. 4 represents a schematic diagram of a radar antenna 40 according to the invention used, for example, in a device for guiding aircraft in the landing phase. The radar antenna 40 is notably used in the radiating band X. The radar antenna 40 has a first reception antenna 41 which can be collocated with a second emission antenna 42.

The reception antenna 41 comprises at least two identical columns 43, 44. Each column 43, 44 comprises N reception subarrays 46 of radiating elements 45. The reception subarrays 46 are, for example, distributed regularly over the entire height of the reception antenna 41. The reception subarrays 46 are reception channels of the reception antenna 41. Each reception subarray 46 notably has an aperture of 20° in azimuth and 20° in elevation. This aperture is sufficient to cover the field in which the aircraft 1 is moving during the landing phase, called field of interest. Each reception subarray 46 covers, notably in elevation, +15° above the ground 30 and −5° below the ground 30 in order to cover any dip in the landing runway 2. The reception subarrays 46 can, for example, be produced using printed circuits.

The emission antenna 42 notably comprises M emission channels or emission feeds 47 that can be identical. In FIG. 4, four emission channels 47 are represented by way of example. Each emission feed 47 notably comprises a subarray of radiating emission elements 48. Each emission subarray 48 can be used to emit a first detection signal 24 notably toward the aircraft 1 to be located. A waveform generator, not represented in FIG. 4, generates the first detection signal 24 emitted. The waveform generator can be produced using a frequency-controlled local oscillator. Each feed 47 also includes an amplifier 49 to amplify the detection signal generated by the waveform generator. The first detection signal 24 emitted by each feed 47 covers, for example, a field of 10° in elevation and 20° in azimuth.

The field illuminated by the emission antenna 40 is limited only by the aperture of an individual antenna consisting, for example, of a line of radiating elements 47. The radar antenna 40 according to the invention therefore advantageously has watch capabilities in an extended angular field.

One or more additional feeds can be used, aiming upward, in order to cover higher sites if necessary.

A search is carried out using the radar antenna 40 according to the invention to detect, initially, a target 31 in a phase of landing on the runway 2. Each feed 47 is, for example, activated in succession in order to detect the target 31. Once the target 31 is detected, the feed 47 that was used to detect the target 31 with a signal of maximum strength is then used to accurately locate the target 31. When a first detection of the target 31 is carried out, the radar antenna 40 according to the invention can be used to localize the target 31 and determine its successive positions according to the same principle as that used for the detection.

In the target 31 detection phase and location phase, one or more reception subarrays 46 receiving a maximum of energy are selected. The selection of one or more reception subarrays 46 is performed by comparing the energy received by the different reception subarrays 46. This comparison is performed either by sequentially switching the various reception subarrays 46, or by simultaneously using the various reception subarrays 46. Switching the reception subarrays 46 makes it possible to move the phase center over the height of the reception antenna 41. Moving the phase center makes it possible to select one or more of the reception subarrays 46 receiving a signal of maximum energy. The signal of maximum energy received on one or more reception subarrays 46 results in a quasi-equality of phase between the direct first path 25 and the second path reflected on the ground 26 in a third path 27 represented in FIG. 2 for example. The maximum energy received on the various reception subarrays 46 of the reception antenna 41 can be estimated for a predefined frequency band notably corresponding to the frequency of the emission antenna 42 or of the first onboard beacon 4.

The detection of a signal in the presence of an image effect is therefore favored by this principle of use of the radar antenna 40 according to the invention. Furthermore, in the location phase, the detection of the target 31 is maintained permanently by selecting one or more reception subarrays 46 receiving a signal of maximum energy, which makes it possible to avoid detection dips usually observed with conventional radars in the presence of reflection on the ground or any other surface having a capacity to reflect the electromagnetic waves.

In practice, in the case where the fourth signal 25, 27 originates from a first active beacon 4 on board the aircraft 1, the term $I(h_1)$ of the relation (4) is used as a multiplying term in a range budget of the radar antenna 40. If $h_1 \geq \lambda d/4h_2$, and if the average sampling step $\Delta$ is sufficiently fine, then at least one of the reception subarrays 46 receives a signal whose amplitude is multiplied by $1+\rho^2+2\rho$, because of the reflection of the fourth signal 25, 27 coming from the target 31 on the ground 30. This is therefore equivalent, for example, to a gain on the range budget of the radar antenna 40 of the order of 6 db, for a fourth signal 25, 27 coming from the first onboard beacon 4, when the reflection coefficient is one. In this case, the range budget obtained on the line of radiating elements 23 receiving a signal of maximum amplitude is equivalent to that which would be obtained excluding reflection on a line of radiating elements approximately four times greater.

Moreover, if the radar range budget is considered on a fourth signal 25, 27 originating from a skin echo from the aircraft 1, given the hypothesis that the emission 42 and reception 42 antennas are collocated, the paths of the signal then being identical when going and returning, the term $I(h_1)$ of the relation (4) is then used squared in the range budget of the radar. In this case, the range budget obtained on the reception subarray 46 which receives the signal of maximum amplitude is equivalent to that which would be obtained excluding reflections on the ground 30 for an antenna with a vertical dimension up to sixteen times greater than the vertical dimension of the line of radiating elements 23. Advantageously, even if the reflection coefficient is less than one, and even if the sampling is not performed strictly on a maximum amplitude, the gain obtained on the range budget remains significant and the selection of the lines of radiating elements receiving the maximum signal makes it possible to avoid detection losses associated with the destructive interferences between the signals originating from the target 31 and from its image 30, represented in FIG. 2.

In another embodiment, the emission antenna 42 according to the invention can include one or more emission channels 47 that move vertically over the plane of the emission antenna 47. Among the successive positions of the emission channel(s) 47, the position of a emission channel or emission position 47 giving rise to a detection of the aircraft 1 is selected in order to handle the location of the aircraft 1. The emission channel(s) then remain positioned on the position that gave rise to the detection.

Similarly, the reception antenna 41 can include one or more lines of subarrays 46 of radiating reception elements 55 moving vertically over the plane of the reception antenna 41. The position of the line or lines of reception subarrays 46 giving the maximum of energy then being preferably selected in order to accurately determine the position of the target 31. The phase center of the received signal is then on the reception position 46 receiving a signal of maximum energy.

Figure 5A:
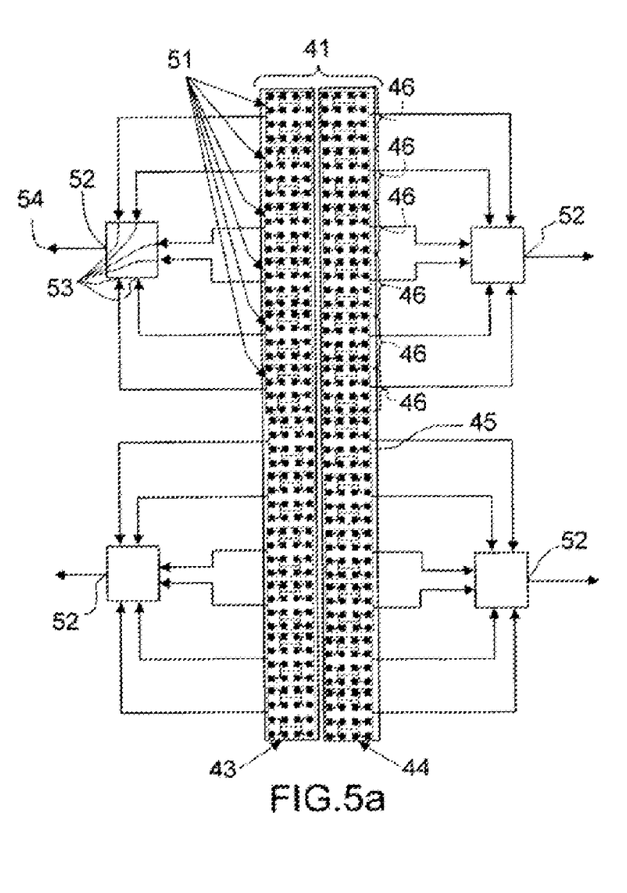
FIG. 5a: a first exemplary embodiment of a receiver of the radar antenna according to the invention.
Figure 5B:
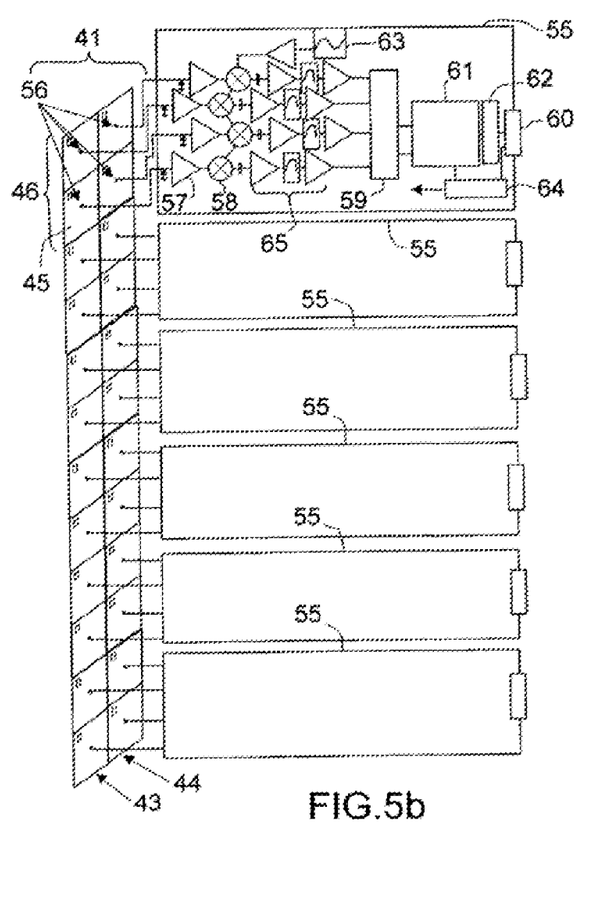
FIG. 5b: a second exemplary embodiment of a receiver of the radar antenna according to the invention.

FIGS. 5a and 5b represent two possible variant embodiments of the reception antenna 41 of the radar antenna 40 according to the invention.

The reception antenna 41 represented in FIG. 5a notably includes two columns 43, 44 each having, for example, twelve reception subarrays 46 of radiating elements 45. The outputs 51 of the reception subarrays 46 are, for example, switched at the microwave level by four microwave switches 52 each having six inputs 53 and an output 54.

The reception antenna 41 represented in FIG. 5b notably has two columns 43, 44 each having, for example, six reception subarrays 46 of radiating elements 45. Each reception subarray 46 is associated with a receiver 55. The receivers 55 are normally used in array antennas. Each receiver 55 can have four inputs 56 corresponding to one output of each radiating element 45 of a reception subarray 46. Each receiver 55 can have four reception channels each corresponding to one input 56. Each reception channel notably has a low noise amplifier 57 in order to optimize the noise factor of the fourth received signal 25, 27. Each receiver 55 is linked to a local oscillator 63 notably supplying a signal to the emission antenna 42, not represented in FIG. 5b. The fourth received signal 25, 27, once the noise factor has been optimized, passes through a mixer 58 which mixes the received signal with the emitted signal. The signal then passes through a set of filters and amplifiers 65. Each reception channel is linked to one and the same analog coder 59 which is used to convert the received analog signal into a digital signal. The fourth signal received 25, 27 is then processed by a programmable component 61 which notably carries out an FFT processing operation on the fourth received signal 25, 27. A serial link 62 is used to pass the fourth received signal 25, 27, via a connector 60, to a computer that is not represented in FIG. 5b which processes it. A regulation component 64 is used to perform a filtering in order to avoid disturbances due to an electrical power supply not represented in FIG. 5b. With this type of reception antenna, the detection method can be implemented by simultaneously addressing all the channels, or sequentially by switching at the level of the digital processing of the fourth received signal 25, 27, according to the available processing resources and the time allotted to perform the processing of the fourth received signal 25, 27.

In other embodiments, the reception subarrays 46 can, for example, be selected on the receiver 55 itself, in analog or digital mode, or even by processing software.

Figure 6A:
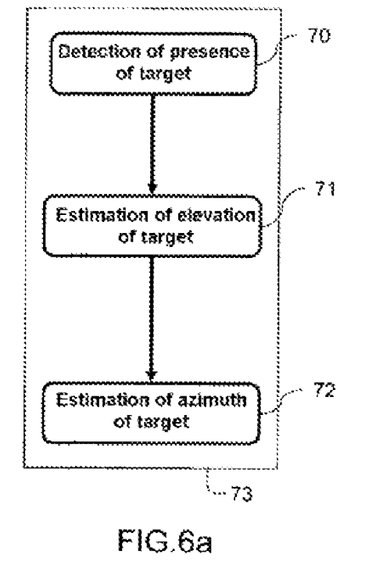
FIG. 6a: the main steps of the method of detecting an aircraft according to the invention.

FIG. 6a represents the main steps of a method 73 of locating an aircraft according to the invention. The method 73 of locating an aircraft is implemented using the radar antenna 40 according to the invention as represented in FIG. 4.

A first step 70 is the detection of the target 1 by the radar antenna 40 according to the invention. This detection of the target 1 is performed by initially scanning all the reception subarrays 46 of the reception antenna 41 as described previously. Then, the reception subarray(s) 46 receiving a signal of maximum amplitude handle the detection.

A second step 71 of the method 73 of locating an aircraft is estimating the elevation of the target 31. Hereinafter, an exemplary method of estimating the elevation of the target 31 is described.

Firstly, the coefficient of reflection of the fourth received signal 25, 27 on the ground is, for example, estimated.

If the reflections on the ground 30 are negligible, the target 31 is located in elevation, for example by means of a conventional angle error measurement processing of monopulse type in signal reception mode. Upward-pointing detection signal emission feeds can in this case be used.

Figure 6B:
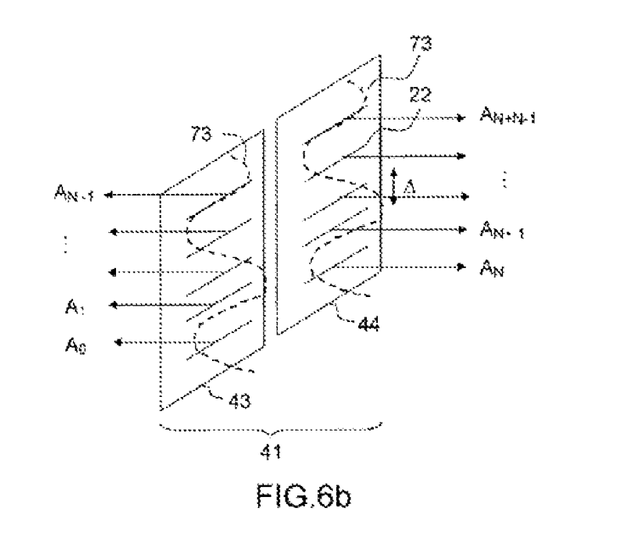
FIG. 6b: an interference signal received on the radar antenna according to the invention.

If there are significant reflections on the ground 30, a calculation of the amplitude modulation frequency of the fourth composite received signal 25, 27 over the height of the reception antenna 41 can be carried out. The calculation of the frequency makes it possible to deduce the elevation of the target 31 as described hereinbelow. The calculation is performed by means of a spatial sampling of the amplitude of the interference signal 73 received over the height of the reception antenna 41 as represented in FIG. 6b. Each sampling position $A_0, A_1, \ldots, A_{N-1}, A_N, A_{N+1}, A_{N+N-1}$ corresponds to a line of independent radiating elements 22, of the reception antenna 41. Each line of radiating elements 22 corresponds to a reception subarray 46 as represented in FIG. 4. The height difference $\Delta$ between two consecutive sampling positions is:

either constant and small enough compared to the frequency of the fourth composite received signal 25, 27;

or not constant.

A sampling carried out in a non-constant manner is, for example, performed when there is a desire to extend the field of non-ambiguity of an elevation measurement. The elevation measurement becomes ambiguous as soon as the phase difference of the sinusoid of the amplitude modulation of the fourth received signal 25, 27 is greater than $\pi$ between two lines of radiating elements 22 that are contiguous in the vertical plane of the reception antenna 41.

When $\theta_1$ is taken to be the angle between the ground 30 and a line linking the position on the ground of the antenna 21 and the position of the target 31, for low values of $\theta_1$, $h_2 = d \times \theta_1$. By using the relation (4), the phase difference between two successive lines of radiating elements 22, whose phase centers are distant from each other by $\Delta$, is equal to $4\pi\Delta\theta_1/\lambda$. Thus, as soon as $\theta_1 > \lambda/4\Delta$, the elevation measurement is ambiguous. For example, if two lines of radiating elements 22 abut with each other, $\Delta$ is then equal to the height of one of the two lines of radiating elements 22 of aperture $\alpha = \lambda/\Delta$. In this case, the elevation measurement is ambiguous as soon as $\theta_1 > \alpha/4$. Notably, for $\alpha = 20°$, $\theta_i$ is ambiguous when it is 5°.

Generally, when $\theta_1 = \lambda/4\Delta + k\pi$, all the samples take the same value. The amplitude modulation is then not visible on the sampling positions $S_0, S_1, \ldots, S_{N-1}, S_N, S_{N+1}, \ldots, S_{N+N-1}$.

To avoid this problem of ambiguity, a sampling can be carried out on positions $S_0, S_1, \ldots, S_{N-1}, S_N, S_{N+1}, \ldots, S_{N+N-1}$ in a non-periodic manner. Such a sampling can be performed so that the phase difference between two successive samples varies over the height of the antenna, and so that this variation is different according to the ambiguity rank I of the modulation frequency relative to the sampling frequency.

For example, a progressive spacing law can be used from one end of the antenna 41 to the other, for example of the type: $\Delta, \Delta+\epsilon, \Delta+2\epsilon, \Delta+3\epsilon, \Delta+4\epsilon, \Delta+4\epsilon, \Delta+5\epsilon, \ldots$, $\epsilon$ being very small compared to $\Delta$. In this way, the phase differences obtained between two successive samples are respectively: $I\pi$, $I\pi+4\pi\epsilon\theta_1/\lambda$, $I\pi+8\pi\epsilon\theta_1/\lambda$, $I\pi+12\pi\epsilon\theta_1/\lambda$, $I\pi+16\pi\epsilon\theta_1/\lambda$, $I\pi+20\pi\epsilon\theta_1/\lambda, \ldots$ This sampling makes it possible to calculate I and $\theta_1$ from samples of the signal received and unambiguously deduces the angle of elevation therefrom.

The ratio between the height $h_2$ of the target 31 relative to the ground 30 and the distance d projected on the ground between the antenna of the radar 40 and the target 31 can be expressed as a function of the frequency f of the interference signal calculated according to the following relation:

$$h_2/d = \lambda f/2 \tag{6}$$

where $\lambda$ is the wavelength of the emitted signal.

The elevation can be estimated by a direct correlation calculation as described hereinbelow.

Initially, a non-coherent summation of the amplitude A of the signal 73 received on two lines of radiating elements 22 of the same rank k, k varying from 0 to (N−1), is performed. Two lines of radiating elements 22 of the same rank K are lines that each belong to one of the columns 43, 44 of the reception antenna 41, situated at one and the same height relative to the ground in the plane of the reception antenna 41. For each rank k, the following is therefore obtained:

$$Sb_k = |A_k|^2 + |A_{N+k}|^2 \tag{7}$$

With flat ground, on a sampling position $S_k$ corresponding to a line of radiating elements 22 situated at a height x from the ground, and for a height $h_2$ of the beacon 4 on board the target 31, an amplitude level S(x) can be expected to be found, said amplitude level having the form:

$$|S(x)|^2 = 1 + \rho^2 - 2*\rho*\cos(4*\pi*h_2*x/(\lambda*d)) \quad (8)$$

The level S(x) corresponds to the amplitude level defined by the relation (4), bearing in mind that the phase φ of the fourth received signal 25, 27 is π because of the horizontal polarization processing of the fourth received signal 25, 27.

The angle $\theta_1$ is discretized into $N_\theta$ angles $\theta_i$ of index i varying from 1 to $N_\theta$, with a discretization step $\Delta_\theta$. An expected level for the fourth received signal 25, 27 on the line of radiating elements 22 of rank k situated at a height $x_k$ from the ground can then be expressed in the form:

$$|S_{\theta_i}(k)|^2 = 1 + \rho^2 - 2*\rho*\cos(4*\pi*x_k*\theta_i/\lambda) \quad (9)$$

Then, a correlation function Correl($\theta_i$) is used, defined as follows:

$$Correl(\theta_i) = \frac{\left(\sum_{k=0}^{k=(N/2)-1} S_{\theta_i}(k) * Sb_k\right)}{\left(\sqrt{\sum_{k=0}^{k=(N/2)-1} S_{\theta_i}^2(k)} * \sqrt{\sum_{k=0}^{k=(N/2)-1} Sb_k^2}\right)} \quad (10)$$

The next step will then be to maximize the function Correl ($\theta_i$) in order to obtain the maximum correlation between the functions $S_{\theta_i}(k)$ and the amplitude of the fourth received signal 25, 27 actually measured on the different lines of radiating elements 22 of the reception antenna 41.

An estimation of $h_2/d$ is then deduced therefrom using the index j of the angle $\theta_i$ for which the function Correl($\theta_i$) is maximum, as follows:

$$h_2/d = \Delta_\theta * j \quad (11)$$

The elevation height can then be determined for a non-flat and non-horizontal ground 30 from:
- a point of reflection R of the second path 26 reemitted by the target 31 toward the ground 30 on the latter,
- the elevation height determined for a flat and horizontal ground 30,
the expression of the equality between the angles of incidence of the rays reemitted by the target toward the ground 26 and that reflected by the ground 30 with a plane tangent to the ground at the point of reflection R making it possible to obtain the coordinates ($x_R$, $z_R$) of the point of reflection R and the angle $\alpha_R$ between the plane tangent to the ground at the point R and the horizontal from the following cost function:

$$|C(r)| = \left| \frac{h_1 - z_R + x_R \times \alpha_R}{x_R} - \frac{h_2}{d - x_R} \right| \quad (12)$$

in which $h_1$ represents the height relative to the ground 30 of the reception antenna 41, $h_2$ represents the estimation of the elevation height calculated in the case of a flat and horizontal ground 30. The values ($x_R$, $z_R$, $\alpha_R$) minimizing the function |C(r)| are the coordinates of the point of reflection R. To finish, obtaining the value of the angle $\alpha_R$ between the plane tangent at R to the ground 30 and the horizontal makes it possible to correct the height of the target $h_2$ relative to the tangent plane to a value $H_2$ as follows: $H_2 = h_2 + z_R + (d - x_R) \times \alpha_R$, $h_2$ being the calculated height of the target 31 relative to the ground in the case of a flat and horizontal ground 30 and d being the distance projected on the ground 30 from the target 31 to the reception antenna 41.

The ambiguity on the estimation of the height of the target is eliminated by using a non-constant sampling over the height of the radar antenna 40. Furthermore, it is possible to use a number of different emission frequencies to improve the location measurement generally and, more particularly, the elevation measurement.

An accurate elevation measurement is thus obtained simply by taking into account the reflection phenomenon on the ground or any other reflecting surface, if necessary.

Figure 6C:
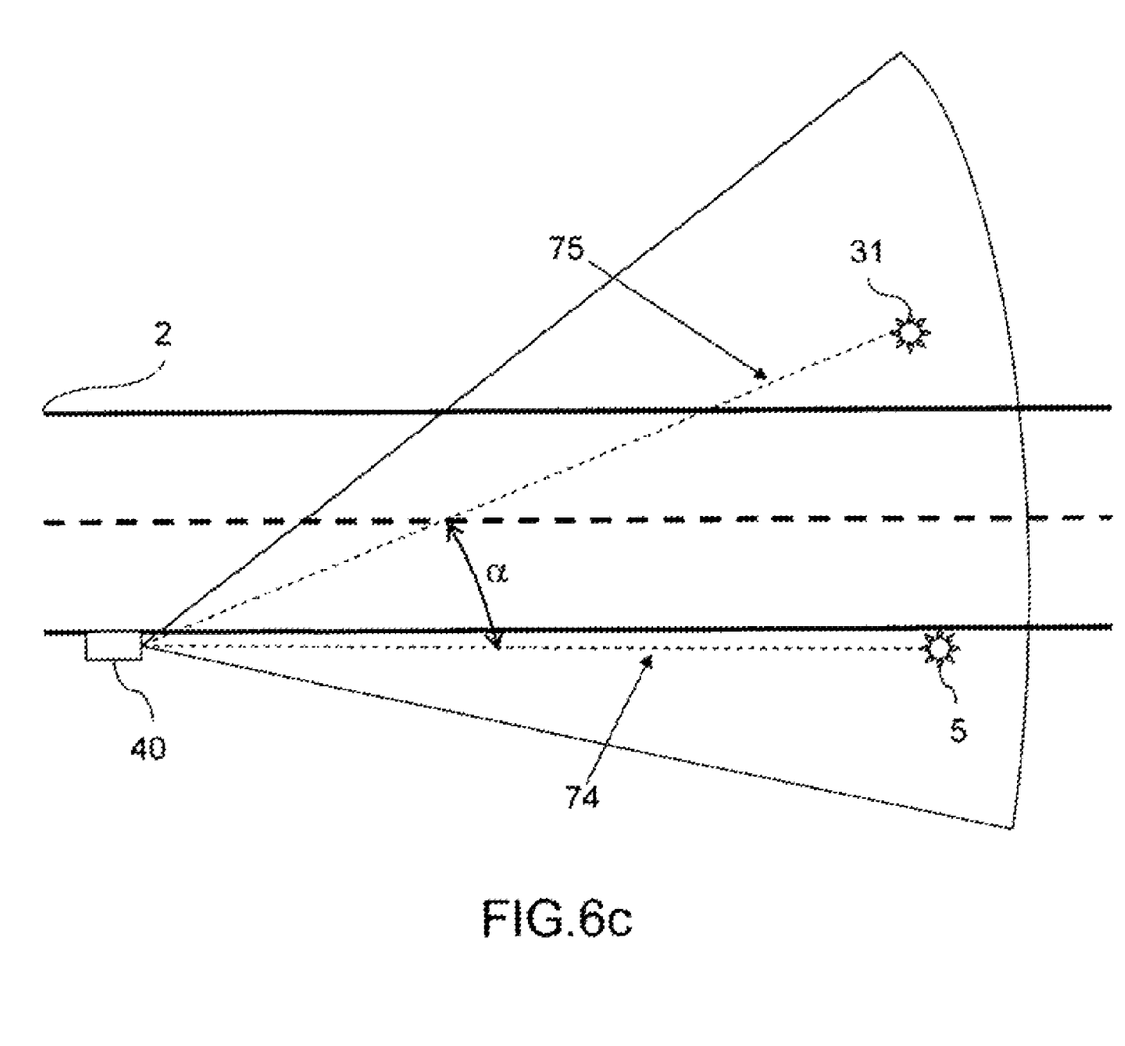
FIG. 6c: a plan view of the device according to the invention for calculating the positioning of the aircraft in azimuth.

A third step 72 of the location method 73 is estimating the azimuth angle of the target 31 by monopulse phase angle error measurement. The angle error measurement calculation is performed by determining an angle α, represented in FIG. 6c, between a first straight line 74 linking the radar antenna 40 and the second beacon 5 and a second straight line 75 linking the radar antenna 40 with the first onboard beacon 4 as represented in FIG. 6c.

The angle error measurement calculation uses the measurements performed by at least two reception subarrays 46 each situated on a column 43, 44 of the reception antenna 41. The two reception subarrays 46 used are notably situated at one and the same height in the plane of the reception antenna 41, and are then said to be of the same rank.

Figure 6D:
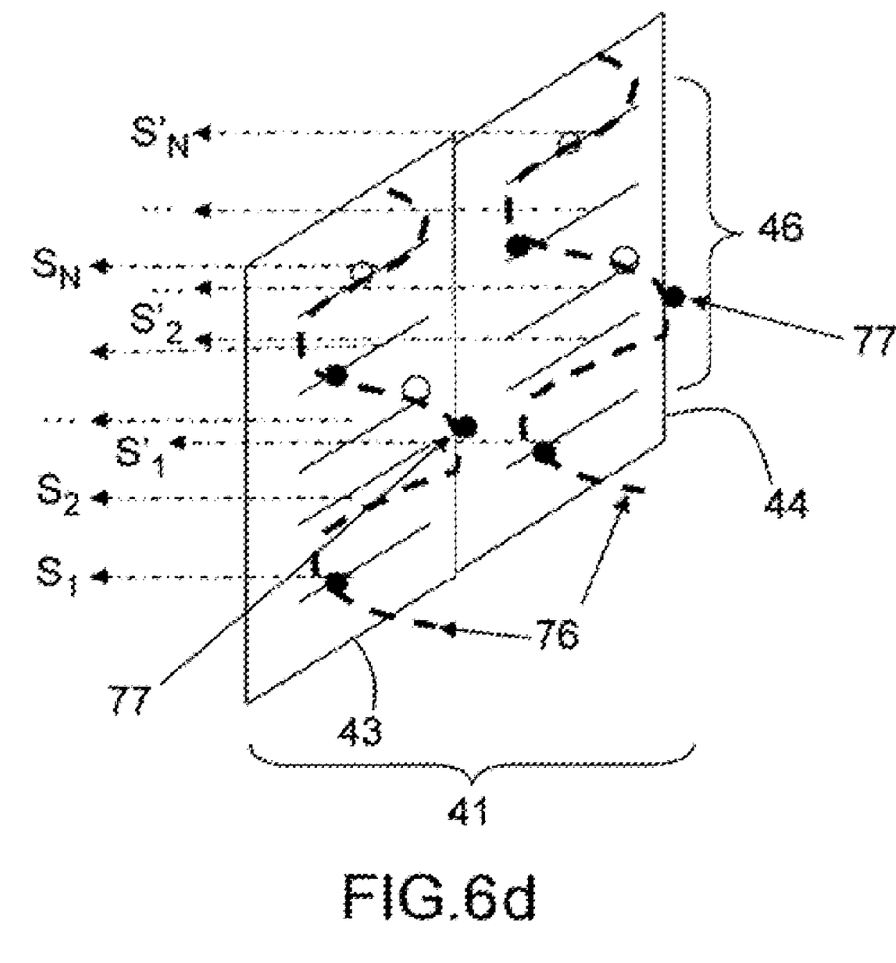
FIG. 6d: a sampling of the interference signal received on the radar antenna according to the invention for calculating the position of the aircraft in azimuth.

A sampling of the modulation signal 76 received on the reception antenna 41, and as represented in FIG. 6d, is performed on each reception subarray 46 of each column 43, 44. Two samples ($S_1, S_2, \ldots, S_N$) and ($S'_1, S'_2, \ldots, S'_N$) of values of the modulation signal 76 are thus obtained. The values 77 retained for the azimuth angle error measurement calculation are those exhibiting a maximum amplitude of the modulation signal. The angle error measurement calculation can then be performed on each pair of reception subarrays 46 of the same rank, using, for example, a phase monopulse type operator by forming sum $S_i + S'_i$ and difference $S_i - S'_i$ channels, i being between 1 and N, N being the number of reception subarrays 46 of the reception antenna 41.

The angle error measurement calculation can also, in another embodiment, be performed with a weighted average of the angle error measurement estimated over all the pairs of reception subarrays 46 of the same rank. A weighting of the average obtained is then performed by using the signal-to-noise ratio observed for each of the pairs of reception subarrays 46 of the same rank.

The antenna of the radar 40 and the location method 73 according to the invention can also be used in the presence of reflections on the sea for example. Generally, the invention can be applied to any communication system confronted by the problem of multiple reflections.

It is also possible to use the invention in the presence of reflections on a vertical or non-vertical surface.

The present invention can also be used to locate other types of mobiles, such as boats or automobiles for example.

The radar antenna 40 according to the invention and the associated method 73 of locating the target 31 advantageously constitute an alternative to the array antenna-based solutions in which the aim is to use all the feeds of the array to form a beam such that the target 31 is seen under a maximum gain, whereas the image 30, is seen under a minimum gain.

Advantageously, the measurement accuracy in elevation in the presence of an image effect is much better than that obtained by a beam-forming array antenna by calculation, given the same physical dimensions.

The detection performed using the radar antenna 40 according to the invention advantageously has a performance stability in the field of angular coverage of a reception subarray 46. In practice, there can be no widening of the associated lobe or weakening of the signal in certain directions that could bias the estimation of the angular position.

In the location phase, selecting a reception subarray 46 receiving the maximum energy makes it possible to advantageously avoid the losses of targets due to the plurality of the paths of the signal emitted by the target 31 in the presence of the phenomenon of reflections on the ground 30 of the signal reemitted by the target 31.

Advantageously, the sequential switching of the various reception subarrays 46 over the height of the antenna allows for an accurate estimation of the elevation of the target 31 in the location phase, while advantageously limiting:

the number of reception channels of the location device;
the information bit rate between the head of the radar and the receiver;
the associated processing operations.

The signal processing operations implemented by the radar antenna 40 according to the invention are advantageously simple and robust: there is no need to apply complex adaptive processing operations which are o also very sensitive to the assumptions made concerning the nature of the reflections on the ground, notably.

Another advantage of the radar according to the invention does not have to know a priori the position of the target, or permanently or adaptively point a beam by electronic scanning. The radar antenna 40 according to the invention also has the benefit of allowing for a relative independence of the accuracy of the results obtained for the location in elevation with respect to inaccuracies in the inclination of the radar antenna 40.

Advantageously, the radar antenna 40 according to the invention can operate in degraded mode; when one or other of the reception channels 46 fails, the other channel can fulfill the function for detecting and locating the target 31. It is also possible to deliberately reduce the number of reception channels 46.

Another benefit of the device 40 according to the invention is that it can be implemented on conventional electronic scanned antennas.

The invention claimed is:

1. A location device for locating a mobile object approaching a surface that reflects electromagnetic waves, the location device comprising:
   an emission antenna comprising one or more emission positions, wherein the emission antenna emits a detection signal toward the mobile object; and
   a reception antenna comprising at least one column of one or more reception positions, wherein the reception antenna receives a signal transmitted by the mobile object;
   wherein:
   the detection signal emitted from an emission position associated with a signal of maximum energy transmitted by the mobile object, is selected to locate the mobile object, and reception positions receiving a signal of maximum energy are used for an angular location of the mobile object in a plane substantially parallel to the surface reflecting the electromagnetic waves.

2. The location device as claimed in claim 1, wherein all reception positions are used for an angular location of the mobile object in a plane substantially perpendicular to the surface reflecting the electromagnetic waves.

3. The location device as claimed in claim 1, wherein:
   the reception antenna further comprises elements arranged in a predetermined number of reception subarrays, a position of a reception subarray corresponding to a reception position; and
   the reception subarrays are activated in succession.

4. The location device as claimed in claim 1, wherein:
   the emission antenna further comprises a predetermined number of emission channels, a position of an emission channel corresponding to an emission position; and
   the emission channels are activated in succession.

5. The location device as claimed in claim 1, wherein the reception antenna comprises a plurality of elements formed into one or more reception subarrays, wherein the reception subarrays are moved to the reception positions.

6. The location device as claimed in claim 5, wherein the reception subarrays are moved continually.

7. The location device as claimed in claim 1, wherein the emission antenna comprises one or more emission channels being moved to the emission positions.

8. The location device as claimed in claim 7, wherein one or more emission channels are moved continually.

9. The location device as claimed in claim 1, wherein the reception positions are non-uniformly spaced apart.

10. The location device as claimed in claim 1, wherein the reception positions are progressively spaced apart.

11. The location device as claimed in claim 1, wherein the emission antenna and the reception antenna are collocated.

12. The location device as claimed in claim 1, wherein the mobile object includes an aircraft.

13. A method of locating a mobile object approaching a substantially horizontal surface reflecting electromagnetic waves produced by a location device, the location device comprising:
   an emission antenna comprising one or more emission positions, wherein the emission antenna emits a detection signal toward the mobile object; and
   a reception antenna comprising at least one column of one or more reception positions, wherein the reception antenna receives a signal transmitted by the mobile object;
   wherein the method comprises the steps of:
   selecting an emission position that produces a maximum signal level transmitted by the mobile object that is detected by the reception antenna, in order to locate the mobile object;
   locating the mobile object by using one or more signals of maximum energy received by one or more reception positions; and
   locating an angular position of the mobile object, in a plane substantially parallel to the surface that reflects the electromagnetic waves, by use of one or more signals of maximum energy received by one or more reception positions.

14. The location method as claimed in claim 13 further comprising the step of locating an angular position of the mobile object, in a plane substantially perpendicular to the surface that reflects the electromagnetic waves, by use of the signals received by each reception position.

15. The location method as claimed in claim 13, wherein the mobile object is an aircraft.

* * * * *